United States Patent [19]

Mihara

[11] Patent Number: 4,483,597
[45] Date of Patent: Nov. 20, 1984

[54] LARGE APERTURE RATIO TELEPHOTO LENS SYSTEM

[75] Inventor: Shinichi Mihara, Hachiooji, Japan

[73] Assignee: Olympus Optical Co., Ltd., Tokyo, Japan

[21] Appl. No.: 401,950

[22] Filed: Jul. 26, 1982

[30] Foreign Application Priority Data

Aug. 14, 1981 [JP] Japan .................. 56-126810

[51] Int. Cl.³ .................................. G02B 13/02
[52] U.S. Cl. .................................. 350/454
[58] Field of Search ............... 350/454, 457, 463, 474, 350/475

[56] References Cited

U.S. PATENT DOCUMENTS 4,176,913  12/1979  Nakamura et al. ............ 350/455

FOREIGN PATENT DOCUMENTS 53-134425  11/1978  Japan .

*Primary Examiner*—John K. Corbin
*Assistant Examiner*—P. M. Dzierzynski
*Attorney, Agent, or Firm*—Cushman, Darby & Cushman

[57] ABSTRACT

A high-performance large aperture ratio telephoto lens system comprising a first lens group having positive refractive power, a second lens group having negative refractive power and a third lens unit having positive refractive power, the large aperture ratio telephoto lens system being arranged to fulfill the conditions shown below and to have the focal length about 200 mm to 300 mm and F number about F2.

(1) $0.4f < f_I < 0.8f$
(2) $0.2f < |f_{II}| < 0.5f$
(3) $0.3f < F_{III} < 0.8f$.

7 Claims, 30 Drawing Figures

LARGE APERTURE RATIO TELEPHOTO LENS SYSTEM

BACKGROUND OF THE INVENTION

1. Field of the Invention

The present invention relates to a high-performance large aperture ratio telephoto lens system with the focal length about 200 mm to 300 mm.

2. Description of the Prior Art

For known telephoto lens systems with the focal length about 200 mm to 300 mm, the F number is about F4 in general. Even in case of bright lens systems, the F number is about F2.8 at the best. However, one of recent tendencies of interchangeable lenses for cameras of 35 mm format is to make the aperture ratio larger and a still brighter telephoto lens system is now being waited for. When, however, it is attempted to design a telephoto lens system with a large aperture ratio, it is difficult to favourably correct chromatic aberration to be caused by the secondary spectrum and to make both of spherical aberration and Petzval's sum small at the same time. Moreover, the lens system becomes large and long. Therefore, as telephoto lens system of F2 class, there is only one known telephoto lens system which is disclosed in Japanese published unexamined patent application No. 134425/78. However, the abovementioned telephoto lens system has a large telephoto ratio, i.e., about 1.23.

SUMMARY OF THE INVENTION

It is, therefore, a primary object of the present invention to provide a large aperture ratio telephoto lens system which is extremely bright, i.e., F2.0, in spite of the fact that the focal length thereof is long, i.e., 200 mm to 300 mm, and which shows high performance and has small telephoto ratio of 1.08 or less.

The telephoto lens system according to the present invention comprises a first lens group I having positive refractive power as a whole, a second lens group II having negative refractive power as a whole, and a third lens unit III having positive refractive power as a whole, and is arranged to fulfill the conditions (1), (2) and (3) shown below:

(1) $0.4f < f_I < 0.8f$ (2) $0.2f < |f_{II}| < 0.5f$ (3) $0.3f < f_{III} < 0.8f$ where, reference symbol $f_I$ represents the focal length of the first lens group I, reference symbol $f_{II}$ represents the focal length of the second lens group II, reference symbol $f_{III}$ represents the focal length of the third lens unit III, and reference symbol f represents the focal length of the lens system as a whole.

Besides, respective lens groups constituting the telephoto lens system according to the present invention are composed as described below. That is, the first lens group I comprises a first lens component having positive refractive power, a second lens component having negative refractive power, a third lens component having positive refractive power, and a fourth lens component which is a positive meniscus lens convex toward the object side or a biconvex lens. The second lens group II comprises a fifth lens component having negative refractive power and a sixth lens component having negative refractive power. The third lens unit III comprises a senventh lens component having positive refractive power.

Large aperture ratio lens systems such as Gauss type lens system have fundamental lens configuration that the lens system comprises a converging lens group, a diverging lens group and a converging lens group in the order from the object side toward the image side. The lens system according to the present invention is also arranged to have such lens configuration as to have power distribution similar to that of Gauss type lens system. Besides, in order to make the telephoto ratio small, i.e., to arrange so that the principal point on the image side of the lens system comes to a position as forward as possible, the second lens group II is arranged in a position spaced from the first lens group I so as to reserve some airspace between the first and second lens groups and, moreover, the total focal length of the second lens group II is made short so that the second lens group has strong diverging effect.

The condition (2) defines the focal length of the above-mentioned second lens group. If $f_{II}$ becomes larger than the upper limit of the condition (2), it becomes difficult to make the telephoto ratio small. When $f_{II}$ becomes smaller than the lower limit of the condition (2), it is advantageous for making the telephoto ratio small. However, it becomes difficult to favourably correct all of spherical aberration, coma flare, distortion and chromatic aberration due to the secondary spectrum at the same time.

To make the telephoto ratio small, it is necessary to let the first lens group I have strong converging effect by making its focal length short. The condition (1) defines the focal length of the first lens group. If $f_I$ becomes larger than the upper limit of the condition (1), it becomes difficult to make the telephoto ratio small. When $f_I$ becomes smaller than the lower limit of the condition (1), it is advantageous for making the telephoto ratio small. However, it becomes difficult to favourably correct all of spherical aberration, coma flare, distortion and secondary spectrum at the same time. Especially, the secondary spectrum is largely caused by the first lens group I and is enlarged by the other lens groups.

When the fourth lens component in the first lens group I is arranged in a position spaced from the other lens components, i.e., the first, second and third lens components, by providing some airspace between the third lens component and fourth lens component, it is possible to make the total weight of the lens system light. If, however, the fourth lens component is arranged in a position too near the image side, the focal length $f_I$ of the first lens group becomes short compared with the telephoto ratio and this is not desirable for correction of aberrations.

The condition (3) defines the focal length of the third lens unit III. If $f_{III}$ becomes larger than the upper limit of the condition (3), positive distortion occurs considerably. If $f_{III}$ becomes smaller than the lower limit of the condition (3), it becomes difficult to make the telephoto ratio small.

When the second lens component is arranged as a biconcave lens or the like which is convenient for the manufacture, it becomes sometimes difficult to correct chromatic aberration. In such case, it is possible to favourably correct both of longitudinal chromatic aberration and lateral chromatic aberration at the same time when both of the fifth lens component and seventh component are respectively arranged as cemented doublets which fulfill the conditions (4) and (5) shown below:

(4) $\nu_{5n} - \nu_{5p} > 10$ (5) $\nu_{7p} - \nu_{7n} > 15$ where, reference symbols $\nu_{5p}$ and $\nu_{5n}$ respectively represent Abbe's numbers of the positive lens and negative lens constituting the fifth lens component, and reference symbols $\nu_{7p}$ and $\nu_{7n}$ respectively represent Abbe's numbers of the positive lens and negative lens constituting the seventh lens component.

That is, when the second lens component is arranged as a biconcave lens, lateral chromatic aberration for the ray of short wavelength caused by this lens component becomes a negative value with a large absolute value and longitudinal chromatic aberration for the ray of short wavelength caused by this lens component becomes a large positive value. This problem can be solved when the fifth lens component and seventh lens component are respectively arranged as cemented doublets each consisting of a positive lens and a negative lens and it is arranged as follows. That is, the difference between Abbe's numbers $\nu_p$ and $\nu_n$ of the positive lens and negative lens constituting the fifth cemented lens component is made large as defined by the condition (4) and the difference between Abbe's numbers $\nu_p$ and $\nu_n$ of the positive lens and negative lens constituting the seventh lens component is also made large as defined by the condition (5) so that lateral chromatic aberration caused by each of these cemented doublets becomes a positive value and longitudinal chromatic aberration caused by each of these cemented doublets becomes a negative value in order to thereby offset chromatic aberration caused by the above-mentioned diconcave lens. Thus, it is possible to favourably correct chromatic aberration of the lens system as a whole.

Now, when the second lens component and third lens component in the first converging lens group (the first lens group I) are interchanged so that the second lens component becomes a positive lens and the third lens component becomes a negative lens, it is advantageous for making the telephoto ratio small.

Besides, it is possible to make Petzval's sum still smaller by favourably correcting lateral chromatic aberration when the seventh lens component is arranged so that it comprises a positive lens, negative lens and positive lens in the order from the object side, these lenses are arranged as single lenses separate from each other or two of them are arranged to form a cemented doublet, and it is so arranged that Abbe's numbers $\nu_p$ of the above-mentioned positive lenses and Abbe's number $\nu_n$ of the above-mentioned negative lens fulfill the ralation expressed by the condition (6) shown below and refractive indices $n_p$ of the above-mentioned positive lenses and refractive index $n_n$ of the above-mentioned negative lens fulfill the relation expressed by the condition (7) shown below:

(6) $\nu_{7p} - \nu_{8n} > 10$, $\nu_{9p} - \nu_{8n} > 10$ (7) $n_{7p} - n_{8n} > 0.1$, $n_{9p} - n_{8n} > 0.1$ where, reference symbol $\nu_{7p}$ represents Abbe's number of the positive lens arranged on the object side in the seventh lens component, rererence symbol $\nu_{8n}$ represents Abbe's number of the negative lens in the seventh lens component, reference symbol $\nu_{9p}$ represents Abbe's number of the positive lens arranged on the image side in the seventh lens component, reference symbol $n_{7p}$ represents the refractive index of the positive lens arranged on the object side in the seventh lens component, reference symbol $n_{8n}$ represents the refractive index of the negative lens in the seventh lens component, and reference symbol $n_{9p}$ represents the refractive index of the positive lens arranged on the image side in the seventh lens component.

It is possible to correct lateral chromatic aberration effectively when the seventh lens component is arranged as described in the above, glass materials with small dispersion (large Abbe's numbers) are used for the positive lenses therein glass material with large dispersion (small Abbe's number) is used for the negative lens therein, and it is so arranged that the above-mentioned condition (6) is fulfilled. When the seventh lens component is arranged as described in the above and, at the same time, the fifth lens component is arranged as a cemented doublet which fulfills the condition (4) as described before, it is possible to correct lateral chromatic aberration more favourably. Besides, when refractive indices of the positive lenses in the seventh lens component are made high and refractive index of the negative lens in the seventh lens component is made low so that the above-mentioned condition (7) is fulfilled, it is possible to make Petzval's sum small. If the condition (6) and/or condition (7) is not fulfilled, the above-mentioned aberrations cannot be corrected favourably and, therefore, the above-mentioned arrangement of the seventh lens component loses its significance.

DETAILED DESCRIPTION OF THE PREFERRED EMBODIMENTS

Figure 1:
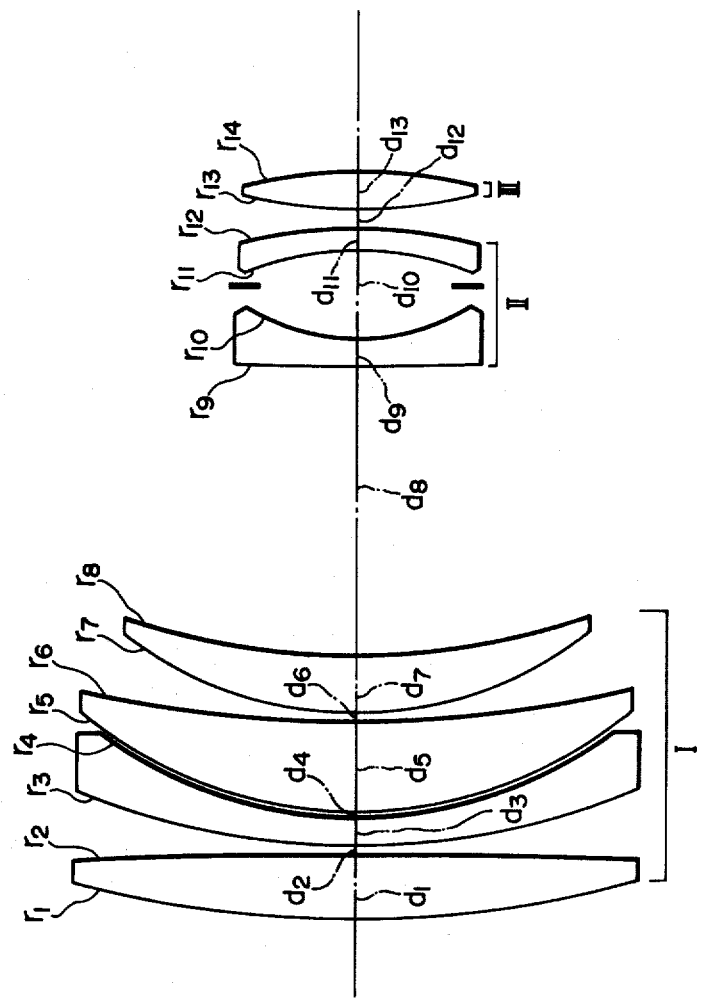
FIGS. 1 through 5 respectively show sectional views of Embodiments 1 through 5 of the large aperture ratio telephoto lens system according to the present invention.

Now, preferred embodiments of the large aperture ratio telephoto lens system according to the present invention described so far are shown below.

| Embodiment 1 | | |
|---|---|---|
| $r_1 = 98.7017$ | | |
| $d_1 = 6.4000$ | $n_1 = 1.49700$ | $\nu_1 = 81.61$ |
| $r_2 = -886.0035$ | | |
| $d_2 = 0.7132$ | | |
| $r_3 = 68.5465$ | | |
| $d_3 = 3.2000$ | $n_2 = 1.71736$ | $\nu_2 = 29.51$ |
| $r_4 = 42.7293$ | | |
| $d_4 = 0.4000$ | | |
| $r_5 = 42.4331$ | | |
| $d_5 = 8.0000$ | $n_3 = 1.49700$ | $\nu_3 = 81.61$ |
| $r_6 = 123.1902$ | | |
| $d_6 = 0.7901$ | | |
| $r_7 = 36.4921$ | | |
| $d_7 = 5.2000$ | $n_4 = 1.61405$ | $\nu_4 = 54.95$ |
| $r_8 = 67.8212$ | | |
| $d_8 = 27.2000$ | | |
| $r_9 = 275.6826$ | | |
| $d_9 = 2.4000$ | $n_5 = 1.68893$ | $\nu_5 = 31.08$ |
| $r_{10} = 18.6995$ | | |
| $d_{10} = 8.6188$ | | |
| $r_{11} = -28.3202$ | | |
| $d_{11} = 2.0101$ | $n_6 = 1.69350$ | $\nu_6 = 53.23$ |
| $r_{12} = -43.8107$ | | |
| $d_{12} = 2.0000$ | | |
| $r_{13} = 55.8572$ | | |
| $d_{13} = 3.2000$ | $n_7 = 1.79952$ | $\nu_7 = 42.24$ |
| $r_{14} = -50.9340$ | | |
| $f = 100, 2\omega = 10.2°$ | | |
| $f_I = 67.1, f_{II} = -22.6, f_{III} = 33.8$ | | |
| telephoto ratio $= 1.07$ | | |

Embodiment 2

| | | |
|---|---|---|
| $r_1 = 62.7870$ | | |
| $d_1 = 6.3968$ | $n_1 = 1.49700$ | $\nu_1 = 81.61$ |
| $r_2 = 254.7626$ | | |
| $d_2 = 0.7094$ | | |
| $r_3 = 64.3102$ | | |
| $d_3 = 3.1946$ | $n_2 = 1.68893$ | $\nu_2 = 31.08$ |
| $r_4 = 44.3243$ | | |
| $d_4 = 2.3998$ | | |
| $r_5 = 39.0266$ | | |
| $d_5 = 7.9950$ | $n_3 = 1.49700$ | $\nu_3 = 81.61$ |
| $r_6 = 163.6161$ | | |
| $d_6 = 18.0051$ | | |
| $r_7 = 24.8172$ | | |
| $d_7 = 5.2013$ | $n_4 = 1.55963$ | $\nu_4 = 61.17$ |
| $r_8 = 57.6824$ | | |
| $d_8 = 6.0029$ | | |
| $r_9 = 224.0323$ | | |
| $d_9 = 1.9998$ | $n_5 = 1.63980$ | $\nu_5 = 34.48$ |
| $r_{10} = 17.1727$ | | |
| $d_{10} = 6.6011$ | | |
| $r_{11} = -35.4438$ | | |
| $d_{11} = 2.0028$ | $n_6 = 1.55963$ | $\nu_6 = 61.17$ |
| $r_{12} = -86.1376$ | | |
| $d_{12} = 9.2005$ | | |
| $r_{13} = 81.8924$ | | |
| $d_{13} = 3.2006$ | $n_7 = 1.79952$ | $\nu_7 = 42.24$ |
| $r_{14} = -68.0100$ | | |

$f = 100, 2\omega = 10.2°$
$f_I = 49.2, f_{II} = -22.1, f_{III} = 46.9$
telephoto ratio = 1.08

Embodiment 3

| | | |
|---|---|---|
| $r_1 = 57.0426$ | | |
| $d_1 = 8.0000$ | $n_1 = 1.49700$ | $\nu_1 = 81.61$ |
| $r_2 = -1284.1181$ | | |
| $d_2 = 2.4000$ | | |
| $r_3 = -144.2420$ | | |
| $d_3 = 3.2000$ | $n_2 = 1.68893$ | $\nu_2 = 31.08$ |
| $r_4 = 162.4364$ | | |
| $d_4 = 0.2000$ | | |
| $r_5 = 45.0574$ | | |
| $d_5 = 8.8000$ | $n_3 = 1.49700$ | $\nu_3 = 81.61$ |
| $r_6 = -521.7284$ | | |
| $d_6 = 12.8000$ | | |
| $r_7 = 47.3799$ | | |
| $d_7 = 4.0000$ | $n_4 = 1.63930$ | $\nu_4 = 44.88$ |
| $r_8 = 109.9734$ | | |
| $d_8 = 10.0000$ | | |
| $r_9 = -82.8030$ | | |
| $d_9 = 1.6000$ | $n_5 = 1.51633$ | $\nu_5 = 64.15$ |
| $r_{10} = 37.0546$ | | |
| $d_{10} = 3.2000$ | $n_6 = 1.54072$ | $\nu_6 = 47.20$ |
| $r_{11} = 5892.8215$ | | |
| $d_{11} = 4.0000$ | | |
| $r_{12} = -93.1116$ | | |
| $d_{12} = 2.0000$ | $n_7 = 1.51633$ | $\nu_7 = 64.15$ |
| $r_{13} = 19.8771$ | | |
| $d_{13} = 8.0000$ | | |
| $r_{14} = 36.7676$ | | |
| $d_{14} = 3.2000$ | $n_8 = 1.69680$ | $\nu_8 = 55.52$ |
| $r_{15} = -36.1124$ | | |
| $d_{15} = 1.6000$ | $n_9 = 1.63980$ | $\nu_9 = 34.48$ |
| $r_{16} = 1648.2317$ | | |

$f = 100, 2\omega = 10.2°$
$f_I = 57.8, f_{II} = -26.0, f_{III} = 49.4$
telephoto ratio = 1.04

Embodiment 4

| | | |
|---|---|---|
| $r_1 = 113.9323$ | | |
| $d_1 = 3.9981$ | $n_1 = 1.60311$ | $\nu_1 = 60.70$ |
| $r_2 = 605.7931$ | | |
| $d_2 = 0.1995$ | | |
| $r_3 = 59.2482$ | | |
| $d_3 = 7.9962$ | $n_2 = 1.49700$ | $\nu_2 = 81.61$ |

-continued

Embodiment 4

| | | |
|---|---|---|
| $r_4 = 9999.0000$ | | |
| $d_4 = 0.9995$ | | |
| $r_5 = -541.1335$ | | |
| $d_5 = 3.1993$ | $n_3 = 1.68893$ | $\nu_3 = 31.08$ |
| $r_6 = 95.1017$ | | |
| $d_6 = 0.1999$ | | |
| $r_7 = 40.4668$ | | |
| $d_7 = 7.9962$ | $n_4 = 1.49700$ | $\nu_4 = 81.61$ |
| $r_8 = 549.6163$ | | |
| $d_8 = 22.7891$ | | |
| $r_9 = -70.8441$ | | |
| $d_9 = 3.1985$ | $n_5 = 1.74950$ | $\nu_5 = 35.27$ |
| $r_{10} = -34.7538$ | | |
| $d_{10} = 1.9990$ | $n_6 = 1.55963$ | $\nu_6 = 61.17$ |
| $r_{11} = 28.3565$ | | |
| $d_{11} = 3.9981$ | | |
| $r_{12} = 54.5868$ | | |
| $d_{12} = 1.9990$ | $n_7 = 1.55963$ | $\nu_7 = 61.17$ |
| $r_{13} = 23.4440$ | | |
| $d_{13} = 6.3970$ | | |
| $r_{14} = 32.5655$ | | |
| $d_{14} = 3.9981$ | $n_8 = 1.71300$ | $\nu_8 = 53.84$ |
| $r_{15} = -36.5538$ | | |
| $d_{15} = 1.9990$ | $n_9 = 1.71736$ | $\nu_9 = 29.51$ |
| $r_{16} = -122.9378$ | | |

$f = 100, 2\omega = 10.2°$
$f_I = 66.0, f_{II} = -24.4, f_{III} = 36.8$
telephoto ratio = 1.08

Embodiment 5

| | | |
|---|---|---|
| $r_1 = 75.4815$ | | |
| $d_1 = 6.0000$ | $n_1 = 1.60311$ | $\nu_1 = 60.70$ |
| $r_2 = 449.9478$ | | |
| $d_2 = 0.1948$ | | |
| $r_3 = 46.1480$ | | |
| $d_3 = 7.8000$ | $n_2 = 1.49700$ | $\nu_2 = 81.61$ |
| $r_4 = -863.7624$ | | |
| $d_4 = 2.8000$ | | |
| $r_5 = -256.0298$ | | |
| $d_5 = 3.2000$ | $n_3 = 1.68893$ | $\nu_3 = 31.08$ |
| $r_6 = 66.0450$ | | |
| $d_6 = 2.3992$ | | |
| $r_7 = 59.0703$ | | |
| $d_7 = 5.2000$ | $n_4 = 1.49700$ | $\nu_4 = 81.61$ |
| $r_8 = -275.9274$ | | |
| $d_8 = 12.7999$ | | |
| $r_9 = -107.6214$ | | |
| $d_9 = 2.8000$ | $n_5 = 1.68893$ | $\nu_5 = 31.08$ |
| $r_{10} = -40.2998$ | | |
| $d_{10} = 2.4000$ | $n_6 = 1.51633$ | $\nu_6 = 64.15$ |
| $r_{11} = 105.0318$ | | |
| $d_{11} = 2.8000$ | | |
| $r_{12} = 278.4266$ | | |
| $d_{12} = 2.0000$ | $n_7 = 1.51633$ | $\nu_7 = 64.15$ |
| $r_{13} = 32.7893$ | | |
| $d_{13} = 15.2000$ | | |
| $r_{14} = 33.8541$ | | |
| $d_{14} = 3.2000$ | $n_8 = 1.73400$ | $\nu_8 = 51.49$ |
| $r_{15} = -103.6635$ | | |
| $d_{15} = 1.2043$ | | |
| $r_{16} = -58.1818$ | | |
| $d_{16} = 1.2000$ | $n_9 = 1.58144$ | $\nu_9 = 40.75$ |
| $r_{17} = 26.2954$ | | |
| $d_{17} = 1.2000$ | | |
| $r_{18} = 45.2421$ | | |
| $d_{18} = 2.8000$ | $n_{10} = 1.73400$ | $\nu_{10} = 51.49$ |
| $r_{19} = 698.4416$ | | |

$f = 100, 2\omega = 10.2°$
$f_I = 66.8, f_{II} = -46.5, f_{III} = 77.2$
telephoto ratio = 1.06

In embodiments shown in the above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1$, $n_2$, ... respectively represent refractive indices of respective lenses, and reference symbols $\nu_1$, $\nu_2$, ... respectively represent Abbe's numbers of respective lenses.

Figure 2:
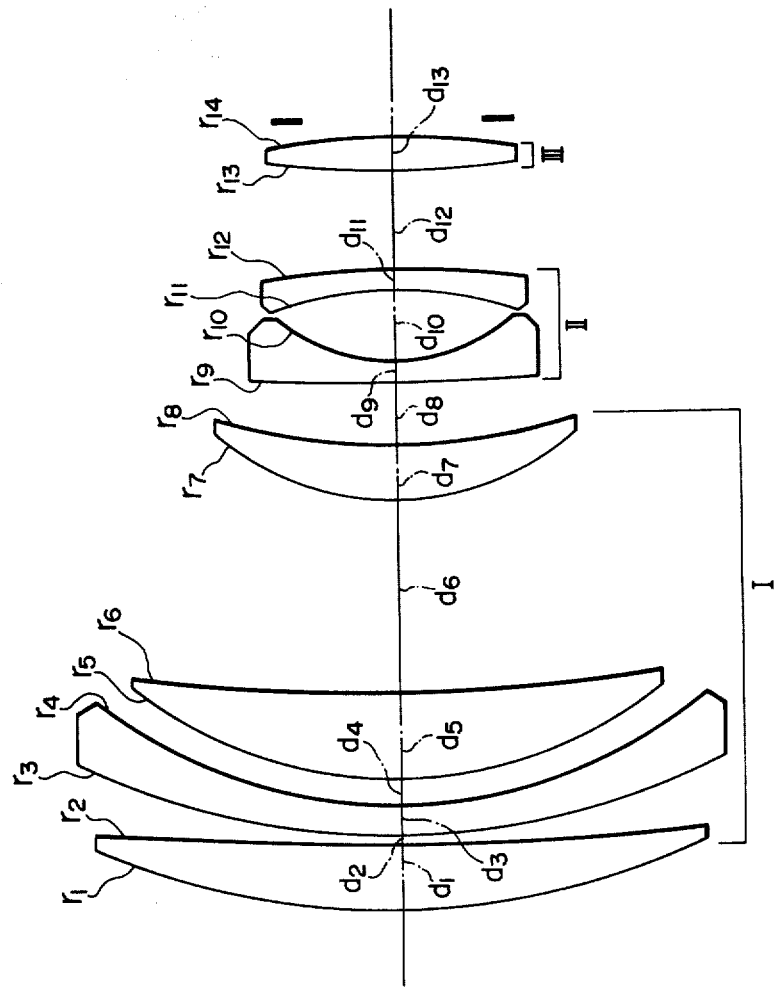
Figure 3:
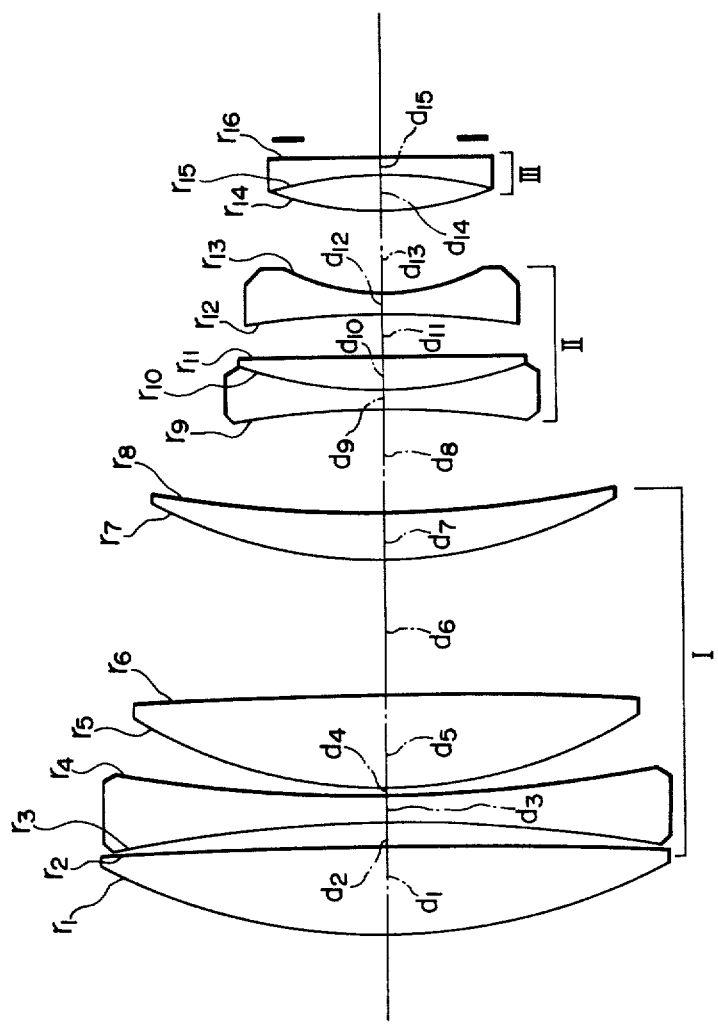
Figure 4:
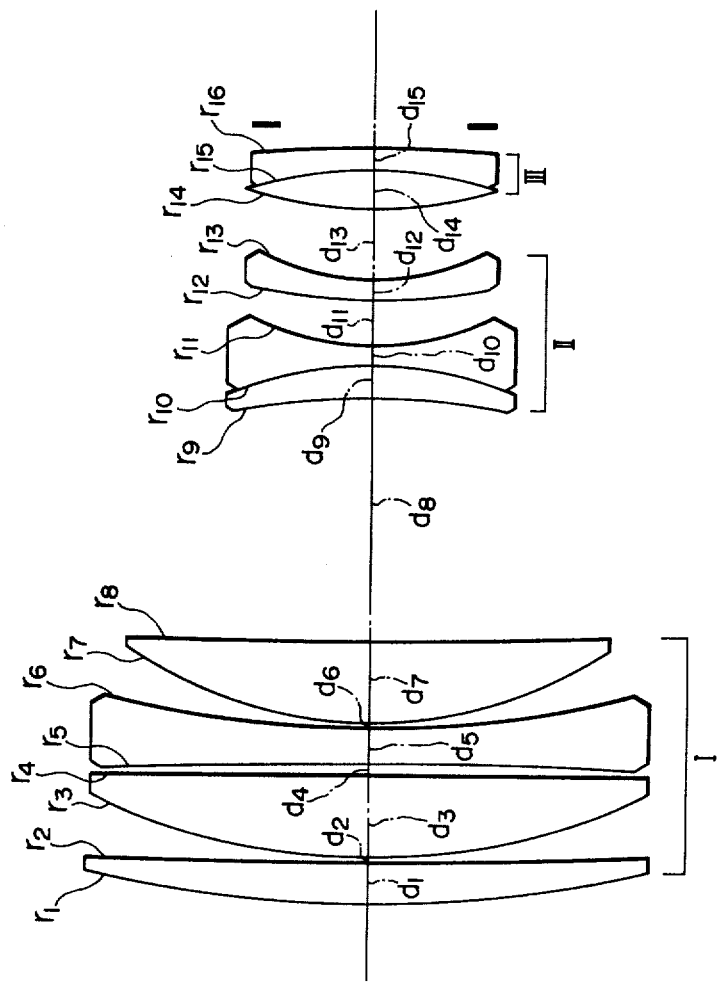
Figure 5:
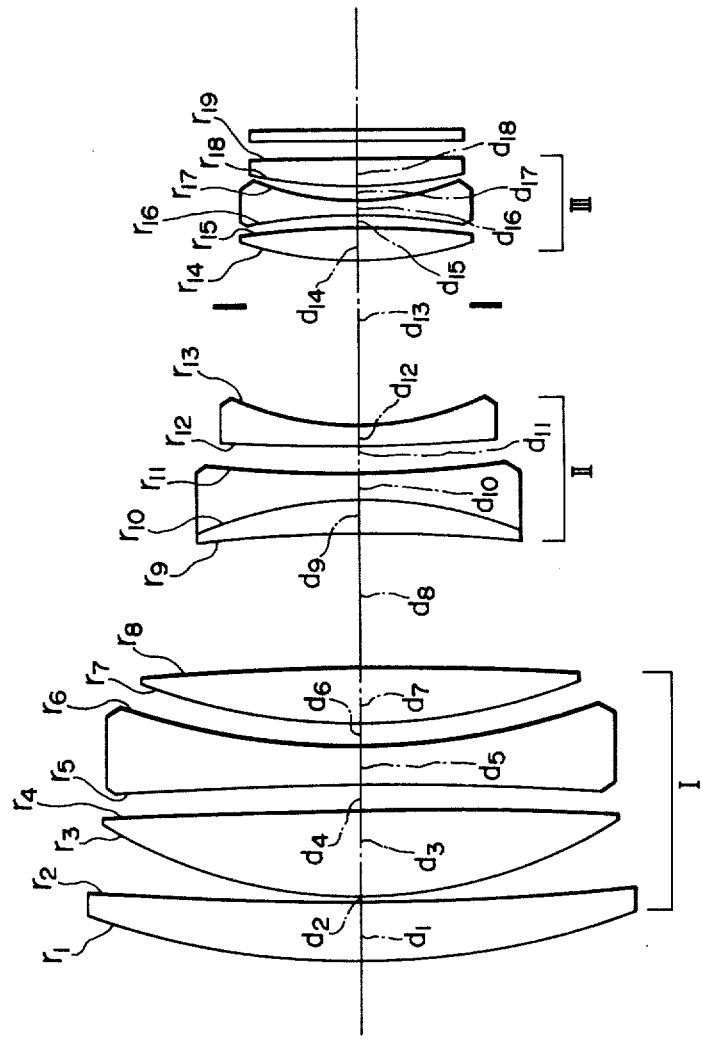
Figure 6:
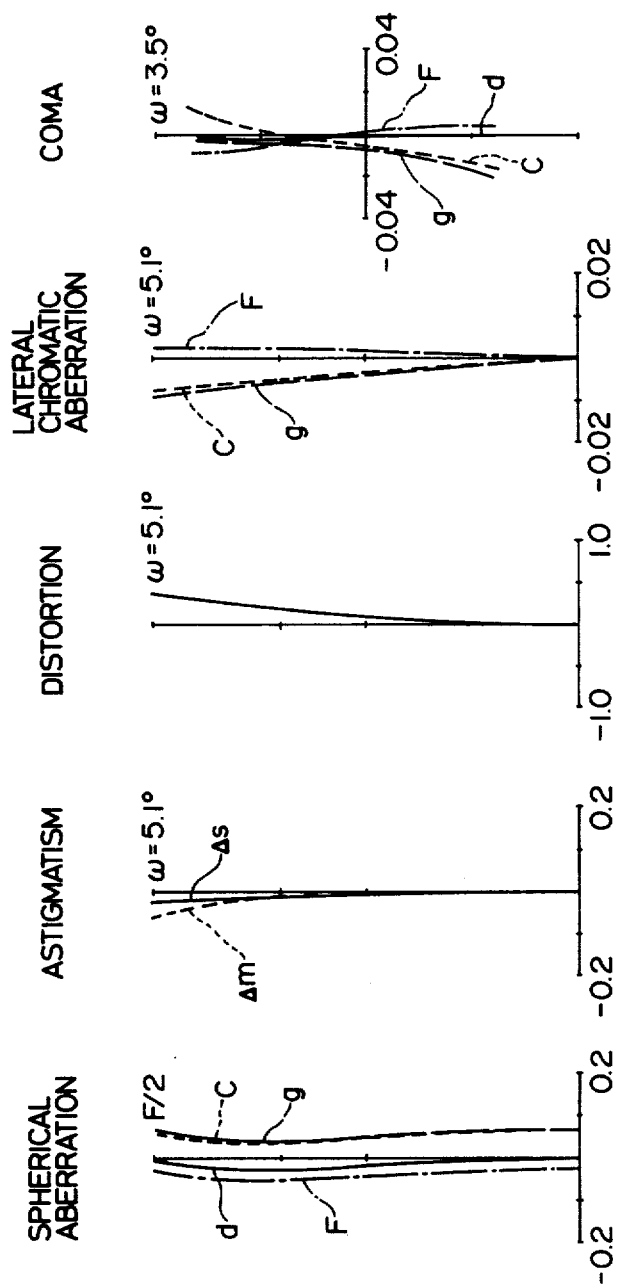
FIGS. 6 through 10 respectively show graphs illustrating aberration curves of Embodiments 1 through 5 of the present invention.
Figure 7:
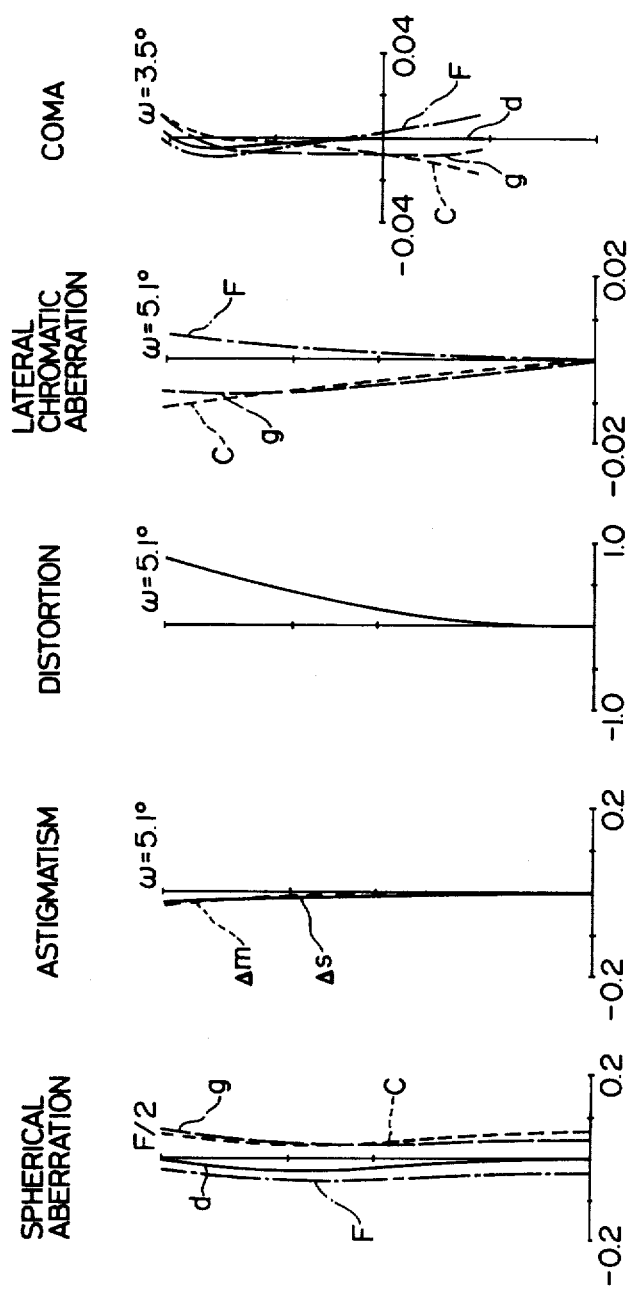
Figure 8:
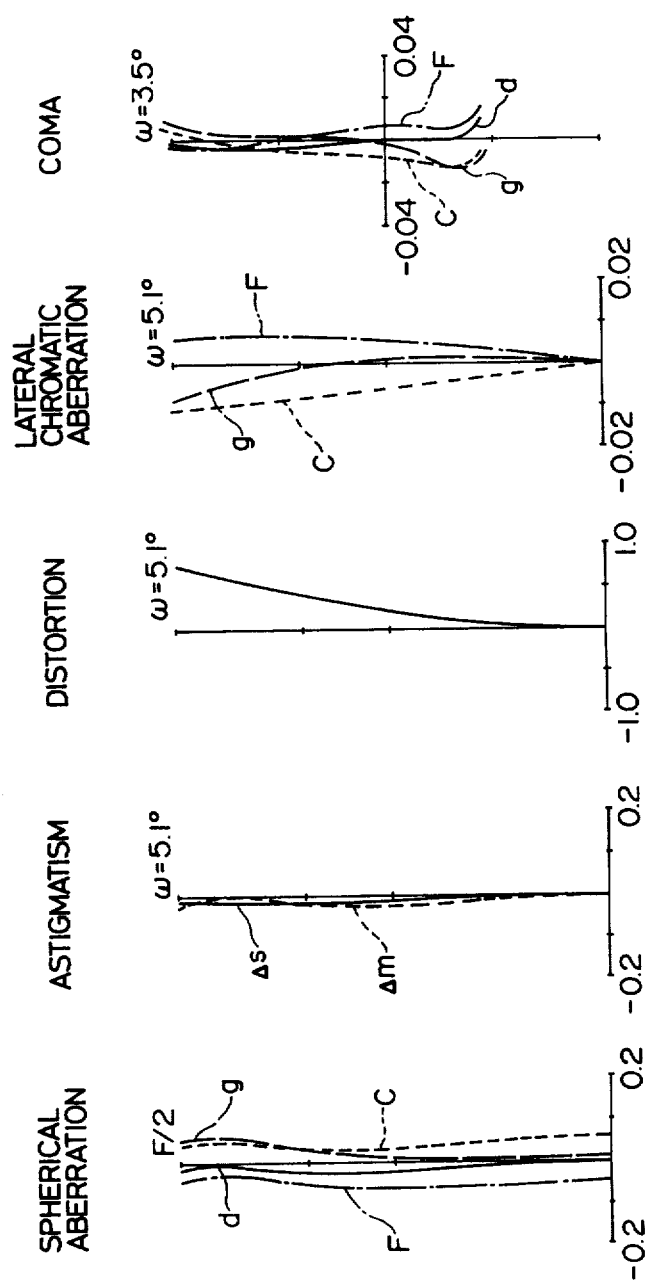
Figure 9:
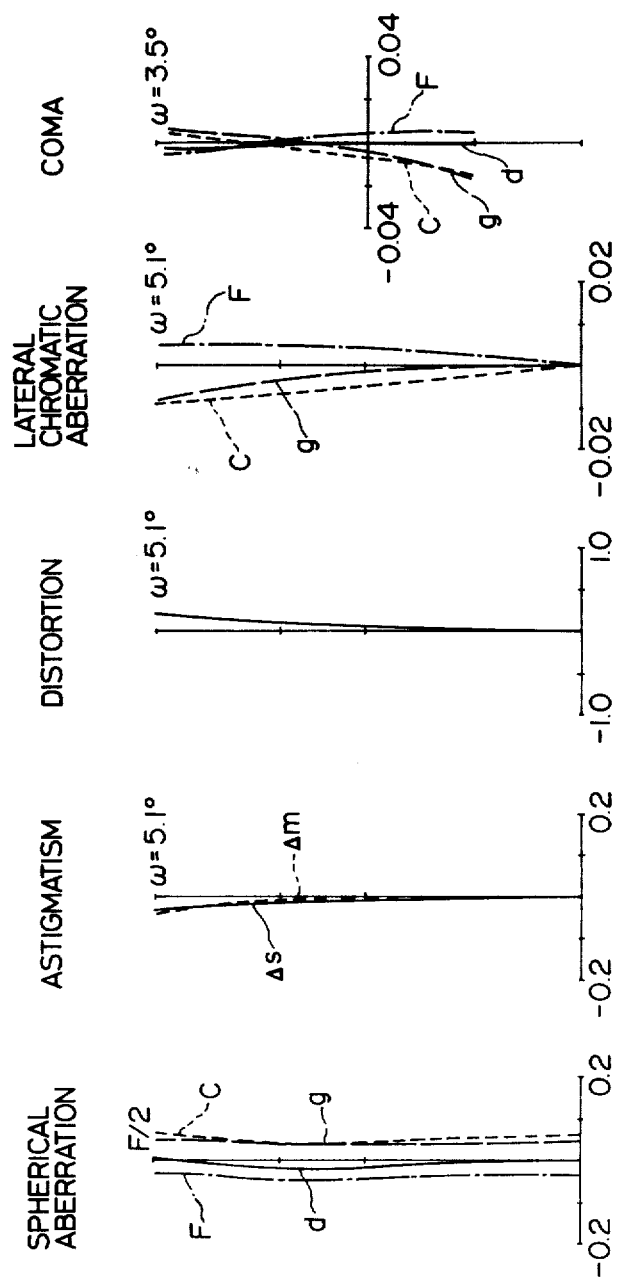
Figure 10:
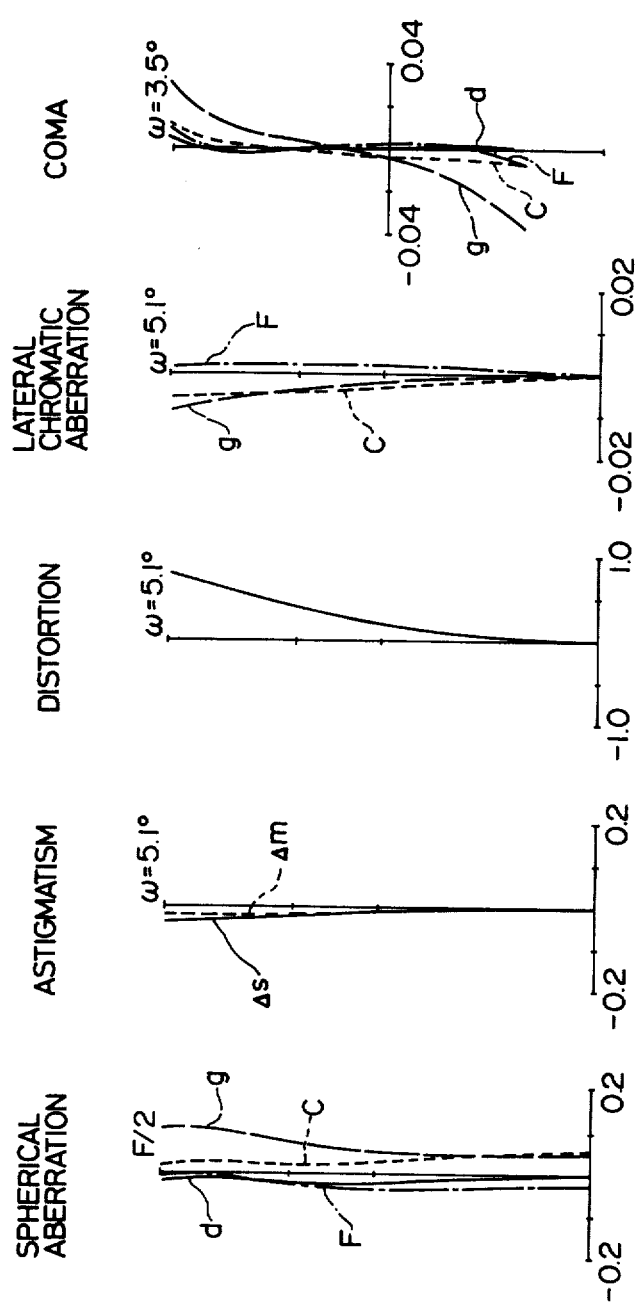

Out of embodiments shown in the above, Embodiment 1 has lens configuration shown in FIG. 1 and its aberration curves are shown in FIG. 6. Embodiment 2 has lens configuration shown in FIG. 2, i.e., the fourth lens component is spaced from the first through third lens components, and its aberration curves are shown in FIG. 7. Embodiment 3 has lens configuration shown in FIG. 3, i.e., the second lens component is arranged as a biconcave lens, the fourth lens component is spaced from the third lens component toward the image side, and both of the fifth and seventh lens components are arranged as cemented doublets. Aberration curves of Embodiment 3 are shown in FIG. 8. Embodiment 4 has lens configuration shown in FIG. 4, i.e., the second lens component is arranged as a positive lens, the third lens component is arranged as a negative lens, and both of the fifth and seventh lens comonents are arranged as cemented doublets. Aberration curves of Embodiment 4 are shown in FIG. 9. Embodiment 5 has lens configuration shown in FIG. 5, i.e., the second lens component is arranged as a positive lens, the third lens component is arranged as a negative lens, the fifth lens component is arranged as a cemented doublet, and the seventh lens component is arranged so that it comprises a positive lens, negative lens and positive lens. Aberration curves of Embodiment 5 are shown in FIG. 10.

I claim:

1. A larger aperture ratio telephoto lens system consisting of a first lens group having four lenses and having positive refractive power as a whole, a second lens group having two negative lenses and having negative refractive power as a whole, and a third lens unit having a single lens, said large aperture ratio telephoto lens system being so adapted as to satisfy the conditions (1) through (3) shown below:

(1) $0.4f < f_I < 0.8f$ (2) $0.2f < |f_{II}| < 0.5f$ (3) $0.3f < f_{III} < 0.8f$ wherein reference symbol f represents the focal length of the lens system as a whole, and reference symbols $f_I$, $f_{II}$ and $f_{III}$ respectively represent focal lengths of the first and second lens groups and the third lens unit.

2. A large aperture ratio telephoto lens system according to claim 1 wherein said first lens group comprises a positive lens, a negative meniscus lens having a convex surface on the object side, a positive meniscus lens having a convex surface on the object side and a positive meniscus lens having a convex surface on the object side, and said second lens group comprises two negative meniscus lenses having concave surfaces facing each other.

3. A large aperture ratio telephoto lens system according to claim 2, in which said large aperture ratio telephoto lens system has the following numerical data:

| | | |
|---|---|---|
| $r_1 = 98.7017$ | | |
| $d_1 = 6.4000$ | $n_1 = 1.49700$ | $\nu_1 = 81.61$ |
| $r_2 = -886.0035$ | | |
| $d_2 = 0.7132$ | | |
| $r_3 = 68.5465$ | | |
| $d_3 = 3.2000$ | $n_2 = 1.71736$ | $\nu_2 = 29.51$ |
| $r_4 = 42.7293$ | | |
| $d_4 = 0.4000$ | | |
| $r_5 = 42.4331$ | | |
| $d_5 = 8.0000$ | $n_3 = 1.49700$ | $\nu_3 = 81.61$ |
| $r_6 = 123.1902$ | | |
| $d_6 = 0.7901$ | | |
| $r_7 = 36.4921$ | | |
| $d_7 = 5.2000$ | $n_4 = 1.61405$ | $\nu_4 = 54.95$ |
| $r_8 = 67.8212$ | | |
| $d_8 = 27.2000$ | | |
| $r_9 = 275.6826$ | | |
| $d_9 = 2.4000$ | $n_5 = 1.68893$ | $\nu_5 = 31.08$ |
| $r_{10} = 18.6995$ | | |
| $d_{10} = 8.6188$ | | |
| $r_{11} = -28.3202$ | | |
| $d_{11} = 2.0101$ | $n_6 = 1.69350$ | $\nu_6 = 53.23$ |
| $r_{12} = -43.8107$ | | |
| $d_{12} = 2.0000$ | | |
| $r_{13} = 55.8572$ | | |
| $d_{13} = 3.2000$ | $n_7 = 1.79952$ | $\nu_7 = 42.24$ |
| $r_{14} = -50.9340$ | | |
| $f = 100$, $2\omega = 10.2°$ | | |
| $f_I = 67.1$, $f_{II} = -22.6$, $f_{III} = 33.8$ | | |
| telephoto ratio $= 1.07$ | | | wherein reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbols $n_1$ through $n_7$ respectively represent refractive indices of respective lenses, reference symbols, $\nu_1$ through $\nu_7$ respectively represent Abbe's numbers of respective lenses, and reference symbol $2\omega$ represents the field angle.

4. A large aperture ratio telephoto lens system according to claim 2, in which said large aperture ratio telephoto lens system has the following numerical data:

| | | |
|---|---|---|
| $r_1 = 62.7870$ | | |
| $d_1 = 6.3968$ | $n_1 = 1.49700$ | $\nu_1 = 81.61$ |
| $r_2 = 254.7626$ | | |
| $d_2 = 0.7094$ | | |
| $r_3 = 64.3102$ | | |
| $d_3 = 3.1946$ | $n_2 = 1.68893$ | $\nu_2 = 31.08$ |
| $r_4 = 44.3243$ | | |
| $d_4 = 2.3998$ | | |
| $r_5 = 39.0266$ | | |
| $d_5 = 7.9950$ | $n_3 = 1.49700$ | $\nu_3 = 81.61$ |
| $r_6 = 163.6161$ | | |
| $d_6 = 18.0051$ | | |
| $r_7 = 24.8172$ | | |
| $d_7 = 5.2013$ | $n_4 = 1.55963$ | $\nu_4 = 61.17$ |
| $r_8 = 57.6824$ | | |
| $d_8 = 6.0029$ | | |
| $r_9 = 224.0323$ | | |
| $d_9 = 1.9998$ | $n_5 = 1.63980$ | $\nu_5 = 34.48$ |
| $r_{10} = 17.1727$ | | |
| $d_{10} = 6.6011$ | | |
| $r_{11} = -35.4438$ | | |
| $d_{11} = 2.0028$ | $n_6 = 1.55963$ | $\nu_6 = 61.17$ |
| $r_{12} = -86.1376$ | | |
| $d_{12} = 9.2005$ | | |
| $r_{13} = 81.8924$ | | |
| $d_{13} = 3.2006$ | $n_7 = 1.79952$ | $\nu_7 = 42.24$ |
| $r_{14} = -68.0100$ | | |
| $f = 100$, $2\omega = 10.2°$ | | |
| $f_I = 49.2$, $f_{II} = -22.1$, $f_{III} = 46.9$ | | |
| telephoto ratio $= 1.08$ | | | wherein reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbols $n_1$ through $n_7$ respectively represent refractive indices of respective lenses, reference symbols $\nu_1$ through $\nu_7$ respectively represent Abbe's numbers of respective lenses, and reference symbol $2\omega$ represents the field angle.

5. A large aperture ratio telephoto lens system comprising a first lens group comprising a positive lens, a negative lens, a positive lens and a positive lens, a second lens group comprising a negative cemented doublet and positive cemented doublet, said large aperture ratio telephoto lens system having the following numerical data:

$r_1 = 57.0426$
$d_1 = 8.0000$   $n_1 = 1.49700$   $\nu_1 = 81.61$
$r_2 = -1284.1181$
$d_2 = 2.4000$
$r_3 = -144.2420$
$d_3 = 3.2000$   $n_2 = 1.68893$   $\nu_2 = 31.08$
$r_4 = 162.4364$
$d_4 = 0.2000$
$r_5 = 45.0574$
$d_5 = 8.8000$   $n_3 = 1.49700$   $\nu_3 = 81.61$
$r_6 = -521.7284$
$d_6 = 12.8000$
$r_7 = 47.2799$
$d_7 = 4.0000$   $n_4 = 1.63930$   $\nu_4 = 44.88$
$r_8 = 109.9734$
$d_8 = 10.0000$
$r_9 = -82.8030$
$d_9 = 1.6000$   $n_5 = 1.51633$   $\nu_5 = 64.15$
$r_{10} = 37.0546$
$d_{10} = 3.2000$   $n_6 = 1.54072$   $\nu_6 = 47.20$
$r_{11} = 5892.8215$
$d_{11} = 4.0000$
$r_{12} = -93.1116$
$d_{12} = 2.0000$   $n_7 = 1.51633$   $\nu_7 = 64.15$
$r_{13} = 19.8771$
$d_{13} = 8.0000$
$r_{14} = 36.7676$
$d_{14} = 3.2000$   $n_8 = 1.69680$   $\nu_8 = 55.52$
$r_{15} = -36.1124$
$d_{15} = 1.6000$   $n_9 = 1.63980$   $\nu_9 = 34.48$
$r_{16} = 1648.2317$
$f = 100, 2\omega = 10.2°$
$f_I = 57.8, f_{II} = -26.0, f_{III} = 49.4$
telephoto ratio = 1.04 wherein reference symbols $r_1$ through $r_{16}$ respectively represent radii of curvature of respective lens surfaces, reference symbols $d_1$ through $d_{15}$ respectively represent thicknesses of respective lenses and airspaces between respective lenses, reference symbols $n_1$ through $n_9$ respectively represent refractive indices of respective lenses, reference symbols $\nu_1$ through $\nu_9$ respectively represent Abbe's numbers of respective lenses, and reference symbol $2\omega$ represents the field angle.

6. A larger aperture ratio telephoto lens system comprising a positive lens, a positive lens, a negative lens and a positive lens, a second lens group comprising a negative cemented doublet and a negative lens, and a third lens unit comprising a positive cemented doublet, said large aperture ratio telephoto lens system having the following numerical data:

$r_1 = 113.9323$
$d_1 = 3.9981$   $n_1 = 1.60311$   $\nu_1 = 60.70$
$r_2 = 605.7931$
$d_2 = 0.1995$
$r_3 = 59.2482$
$d_3 = 7.9962$   $n_2 = 1.49700$   $\nu_2 = 81.61$
$r_4 = 9999.0000$
$d_4 = 0.9995$
$r_5 = -541.1335$
$d_5 = 3.1993$   $n_3 = 1.68893$   $\nu_3 = 31.08$
$r_6 = 95.1017$
$d_6 = 0.1999$ $r_7 = 40.4668$
$d_7 = 7.9962$   $n_4 = 1.49700$   $\nu_4 = 81.61$
$r_8 = 549.6163$
$d_8 = 22.7891$
$r_9 = -70.8441$
$d_9 = 3.1985$   $n_5 = 1.74950$   $\nu_5 = 35.27$
$r_{10} = -34.7538$
$d_{10} = 1.9990$   $n_6 = 1.55963$   $\nu_6 = 61.17$
$r_{11} = 28.3565$
$d_{11} = 3.9981$
$r_{12} = 54.5868$
$d_{12} = 1.9990$   $n_7 = 1.55963$   $\nu_7 = 61.17$
$r_{13} = 23.4440$
$d_{13} = 6.3970$
$r_{14} = 32.5655$
$d_{14} = 3.9981$   $n_8 = 1.71300$   $\nu_8 = 53.84$
$r_{15} = -36.5538$
$d_{15} = 1.9990$   $n_9 = 1.71736$   $\nu_9 = 29.51$
$r_{16} = -122.9378$
$f = 100, 2\omega = 10.2°$
$f_I = 66.0, f_{II} = -24.4, f_{III} = 36.8$
telephoto ratio = 1.08 wherein reference symbols $r_1$ through $r_{16}$ respectively represent radii of curvature of respective lens surfaces, reference symbols $d_1$ through $d_{15}$ respectively represent thicknesses of respective lenses and airspaces between respective lenses, reference symbols $n_1$ through $n_9$ respectively represent refractive indices of respective lenses, reference symbols $\nu_1$ through $\nu_9$ respectively represent Abbe's numbers of respective lenses, and reference symbol $2\omega$ represents the field angle.

7. A large aperture ratio telephoto lens system comprising a first lens group comprising a positive lens, a positive lens, a negative lens and a positive lens, a second lens group comprising a negative cemented doublet and a negative lens and a third lens unit comprising a positive lens, a negative lens and a positive lens, said larger aperture ratio telephoto lens system having the following numerical data:

$r_1 = 75.4815$
$d_1 = 6.0000$   $n_1 = 1.60311$   $\nu_1 = 60.70$
$r_2 = 449.9478$
$d_2 = 0.1948$
$r_3 = 46.1480$
$d_3 = 7.8000$   $n_2 = 1.49700$   $\nu_2 = 81.61$
$r_4 = -863.7624$
$d_4 = 2.8000$
$r_5 = -256.0298$
$d_5 = 3.2000$   $n_3 = 1.68893$   $\nu_3 = 31.08$
$r_6 = 66.0450$
$d_6 = 2.3992$
$r_7 = 59.0703$
$d_7 = 5.2000$   $n_4 = 1.49700$   $\nu_4 = 81.61$
$r_8 = -275.9274$
$d_8 = 12.7999$
$r_9 = -107.6214$
$d_9 = 2.8000$   $n_5 = 1.68893$   $\nu_5 = 31.08$
$r_{10} = -40.2998$
$d_{10} = 2.4000$   $n_6 = 1.51633$   $\nu_6 = 64.15$
$r_{11} = 105.0318$
$d_{11} = 2.8000$
$r_{12} = 278.4266$
$d_{12} = 2.0000$   $n_7 = 1.51633$   $\nu_7 = 64.15$
$r_{13} = 32.7893$
$d_{13} = 15.2000$
$r_{14} = 33.8541$
$d_{14} = 3.2000$   $n_8 = 1.73400$   $\nu_8 = 51.49$
$r_{15} = -103.6635$
$d_{15} = 1.2043$
$r_{16} = -58.1818$
$d_{16} = 1.2000$   $n_9 = 1.58144$   $\nu_9 = 40.75$
$r_{17} = 26.2954$
$d_{17} = 1.2000$
$r_{18} = 45.2421$

-continued $d_{18} = 2.8000 \quad n_{10} = 1.73400 \quad \nu_{10} = 51.49$
$r_{19} = 698.4416$
$f = 100, 2\omega = 10.2°$
$f_I = 66.8, f_{II} = -46.5, f_{III} = 77.2$
telephoto ratio = 1.06 wherein reference symbols $r_1$ through $r_{19}$ respectively represent radii of curvature of respective lens surfaces, reference symbols $d_1$ through $d_{18}$ respectively represent thicknesses of respective lenses and airspaces between respective lenses, reference symbols $n_1$ through $n_{10}$ respectively represent refractive indices of respective lenses, reference symbols $\nu_1$ through $\nu_{10}$ respectively represent Abbe's numbers of respective lenses, and reference symbol $2\omega$ represents the field angle.

* * * * *